US 12,520,831 B2
United States Patent
Akiba

(10) Patent No.: US 12,520,831 B2
(45) Date of Patent: Jan. 13, 2026

(54) REEL SEAT

(71) Applicant: GLOBERIDE, INC., Higashikurume (JP)

(72) Inventor: Masaru Akiba, Higashikurume (JP)

(73) Assignee: GLOBERIDE, Inc., Tokyo (JP)

( * ) Notice: Subject to any disclaimer, the term of this patent is extended or adjusted under 35 U.S.C. 154(b) by 0 days.

(21) Appl. No.: 18/711,464

(22) PCT Filed: Oct. 13, 2022

(86) PCT No.: PCT/JP2022/038243
§ 371 (c)(1),
(2) Date: Jun. 28, 2024

(87) PCT Pub. No.: WO2023/068165
PCT Pub. Date: Apr. 27, 2023

(65) Prior Publication Data
US 2025/0008936 A1 Jan. 9, 2025

(30) Foreign Application Priority Data
Oct. 19, 2021 (JP) .................... 2021-171012

(51) Int. Cl.
*A01K 87/06* (2006.01)
(52) U.S. Cl.
CPC .................. *A01K 87/06* (2013.01)
(58) Field of Classification Search
CPC .... A01K 87/06; A01K 87/008; A01K 87/009; A01K 89/0179; A01K 89/0123; F41G 1/18
See application file for complete search history.

(56) References Cited

U.S. PATENT DOCUMENTS 5,518,194 A * 5/1996 Jeung .............. A01K 89/01
242/282
6,357,165 B1 3/2002 Lu
(Continued)

FOREIGN PATENT DOCUMENTS

JP S58-182677 U 12/1983
JP 2000-041541 A 2/2000
(Continued)

OTHER PUBLICATIONS

Nov. 29, 2022 International Search Report issued in International Patent Application No. PCT/JP2022/038243.
(Continued)

*Primary Examiner* — Katelyn T Truong
(74) *Attorney, Agent, or Firm* — Oliff PLC

(57) ABSTRACT

A seat main body of a reel seat includes a nut member fitted to a floating hood fixing a reel leg to move the floating hood, and a click mechanism in a fitting region between the floating hood and the nut member. The click mechanism has a recess-and-projection formed on an inner peripheral surface of the nut member, a plate spring having a top portion engaged with the recess-and-projection, an arc-shaped recessed portion formed on an outer peripheral surface of the floating hood, and in which the plate spring is installed, and protrusions formed on both sides of the recessed portion in a circumferential direction and engaged with the bent locking portions, and a gap is formed with respect to the bent locking portions in a state where the bent locking portions of the plate spring are engaged with the protrusions by rotationally operating the nut member.

5 Claims, 11 Drawing Sheets

(56) References Cited

U.S. PATENT DOCUMENTS

2002/0020103 A1    2/2002   Yamamoto et al.
2016/0198689 A1*   7/2016   Omura ............. A01K 89/01127
                                                                                 43/22

FOREIGN PATENT DOCUMENTS

| | | |
|---|---|---|
| JP | 2000-333564 A | 12/2000 |
| JP | 2000-342123 A | 12/2000 |
| JP | 2001-145439 A | 5/2001 |
| JP | 2002-191267 A | 7/2002 |
| KR | 200423033 Y1 * | 8/2006 ......... A01K 89/0179 |
| KR | 20190021683 A * | 3/2019 ........... A01K 89/033 |
| WO | WO-2019026384 A1 * | 2/2019 ............... H01H 3/50 |

OTHER PUBLICATIONS

Apr. 23, 2024 International Preliminary Report on Patentability issued in International Patent Application No. PCT/JP2022/038243.
Oct. 3, 2024 Office Action issued in Japanese Patent Application No. 2021-171012.
Oct. 20, 2025 Office Action issued in Chinese Application No. 202280081841.2.

* cited by examiner

REEL SEAT

TECHNICAL FIELD

The present invention relates to a reel seat that is attached to various fishing rods, each of which a reel is mounted on, and is used for mounting and fixing the reel, and more particularly, to a reel seat that produces click sound when a floating hood is moved.

BACKGROUND ART

Hitherto, it has been known to fix a tubular reel seat to an outer peripheral surface of a root rod of a fishing rod using a reel. In general, such a reel seat has a structure in which a fixed hood is provided on one end side of a reel leg placing portion in an axial direction and a floating hood is provided on the other end side of the reel leg placing portion in the axial direction. The floating hood is engaged with a nut member so as to be secured against rotation, and the floating hood is moved closer to/away from the fixed hood by rotationally operating the nut member.

As the reel seat having the above-described structure, there is known a reel seat provided with a click mechanism that produces click sound when the nut member is rotationally operated. For example, Patent Literature 1 discloses a click mechanism in which a support member to which a plate spring is attached is disposed between a nut member and a reel seat, and Patent Literature 2 discloses a click mechanism in which a support member to which a coil spring and a ball part are attached is disposed between a nut member and a reel seat. In any of the configurations, recess-and-projections in which the plate spring and the ball part are elastically engaged are formed on an inner surface of the nut member over a circumferential direction, and click sound is produced by rotationally operating the nut member.

CITATION LIST

Patent Literature

Patent Literature 1: JP 2000-342123 A
Patent Literature 2: JP 2001-145439 A

SUMMARY OF INVENTION

Technical Problem

Since the click mechanism according to the related art has the structure in which the support member for attaching an elastic member is disposed between the nut member and the reel seat, an outer diameter of the floating hood is increased, appearance is deteriorated, and the click mechanism is functionally not preferable. In this case, in order to reduce the outer diameter of the floating hood, it is necessary to reduce a screw outer diameter, so that a usable range is limited. In addition, in the structure in which the ball part is biased by the coil spring, the number of parts is large, a cost is high, the structure is unstable, so that a failure or the like occurs more easily.

The present invention has been made in view of the above problems, and an object of the present invention is to provide a reel seat incorporating a click mechanism that produces click sound with a simple structure without increasing outer diameters of a floating hood and a nut member.

Solution to Problem

In order to achieve the above-described object, a reel seat according to the present invention comprises:
a seat main body comprising a reel leg placing portion on which a reel leg of a fishing reel is placed, and a tubular portion having an opening hole to which a rear end portion of a rod is fitted and fixed, in which the seat main body comprises a floating hood that is moved in an axial direction and fixes the reel leg placed on the reel leg placing portion, a nut member that is fitted to the floating hood so as to move the floating hood in the axial direction in a state where the floating hood is secured against rotation, and a click mechanism provided in a fitting region between the floating hood and the nut member, the click mechanism comprises a recess-and-projection that is formed on an inner peripheral surface of the nut member and produces click sound, a plate spring having a top portion engaged with the recess-and-projection and having bent locking portions positioned at both ends of the plate spring, an arc-shaped recessed portion that is formed on an outer peripheral surface of the floating hood, and in which the plate spring is installed, and protrusions formed on both sides of the recessed portion in a circumferential direction and engaged with the bent locking portions, and the recessed portion is formed so as to have a gap between the bent locking portions and the recessed portion in a state where the bent locking portions of the plate spring are engaged with the protrusions by rotationally operating the nut member.

The click mechanism of the reel seat described above is provided in the fitting region between the floating hood and the nut member, and the click mechanism comprises the plate spring having the top portion that is engaged with the recess-and-projection formed on the inner peripheral surface of the nut member. Since the plate spring is configured to be installed in the arc-shaped recessed portion formed on the outer peripheral surface of the floating hood in the fitting region, it is not necessary to separately provide a support member as in the related art, and since the plate spring is configured to produce the click sound by elasticity of the plate spring installed in the recessed portion, the structure is simple, and outer diameters of the floating hood and the nut member are not increased. Furthermore, when the nut member is rotationally operated, one end of the plate spring is supported by the protrusion and the other end of the plate spring can be freely moved. Therefore, when the nut member is rotationally operated, the plate spring easily snaps back due to the recess-and-projection, and the click sound can be enhanced.

The reel seat having the above-described configuration can be fixed to an outer peripheral surface of a rod (root rod) of each of various fishing rods.

Advantageous Effects of Invention

According to the present invention, it is possible to obtain a reel seat incorporating a click mechanism that produces click sound with a simple structure without increasing outer diameters of a floating hood and a nut member, and a fishing rod on which such a reel seat is mounted.

BRIEF DESCRIPTION OF DRAWINGS

FIG. 2 illustrates exploded perspective views of the reel seat portion illustrated in FIG. 1, in which

FIG. 3 illustrates a nut member included in the reel seat, in which

FIG. 4 illustrates a floating hood included in the reel seat, in which

FIG. 5 illustrates a configuration of a plate spring installed on the floating hood, in which

FIG. 6 illustrates a state where the nut member is fitted to the floating hood (a structure of a click mechanism), in which

FIG. 7 illustrates the structure of the click mechanism, in which

FIG. 9 illustrates a modification of the click mechanism, in which

DESCRIPTION OF EMBODIMENTS

Hereinafter, an embodiment of a reel seat according to the present invention will be specifically described with reference to the accompanying drawings.

Figure 1:
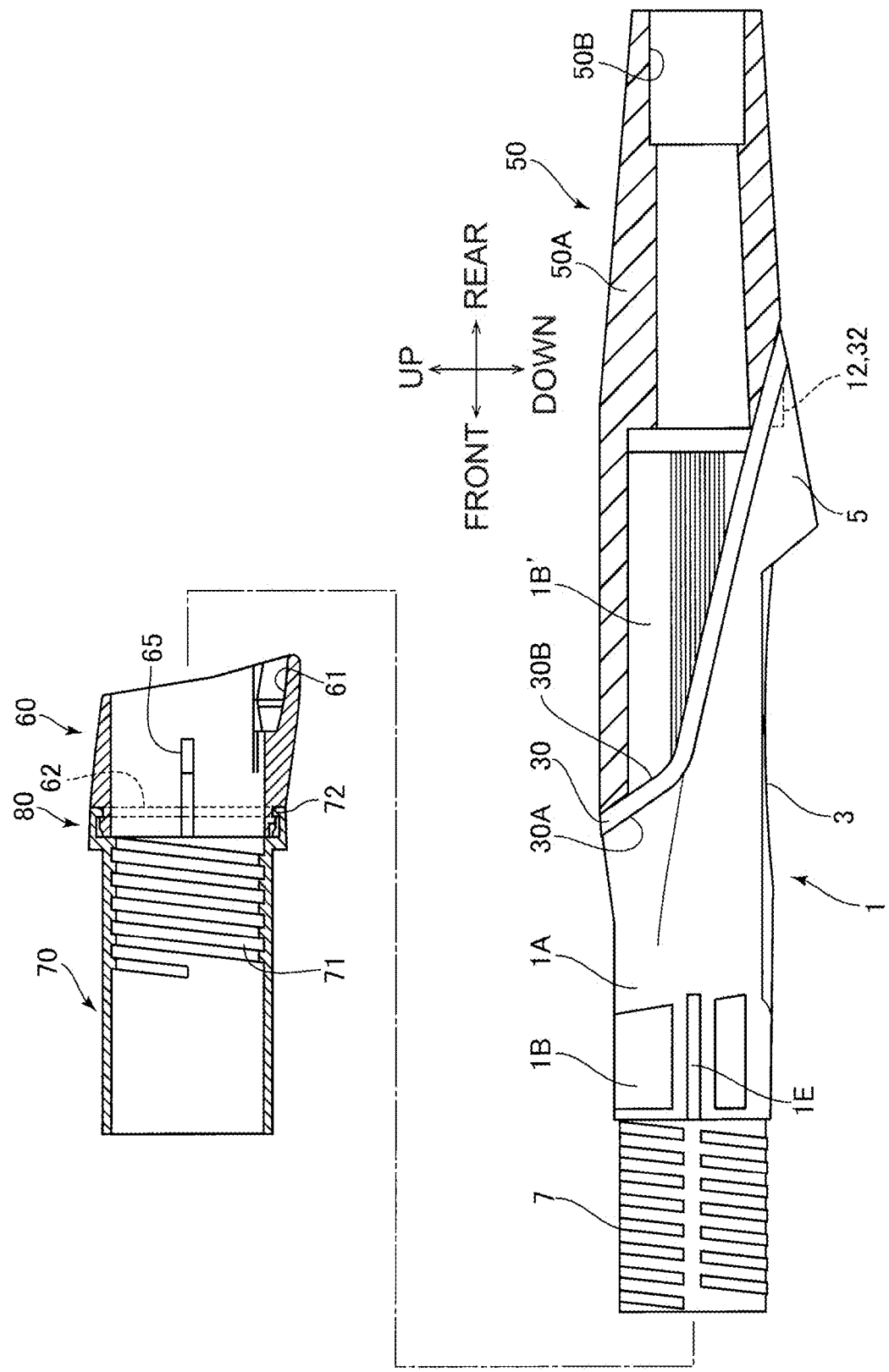
FIG. 1 is a partial cross-sectional view illustrating one embodiment of a reel seat according to the present invention in an axial direction.
Figure 2A:
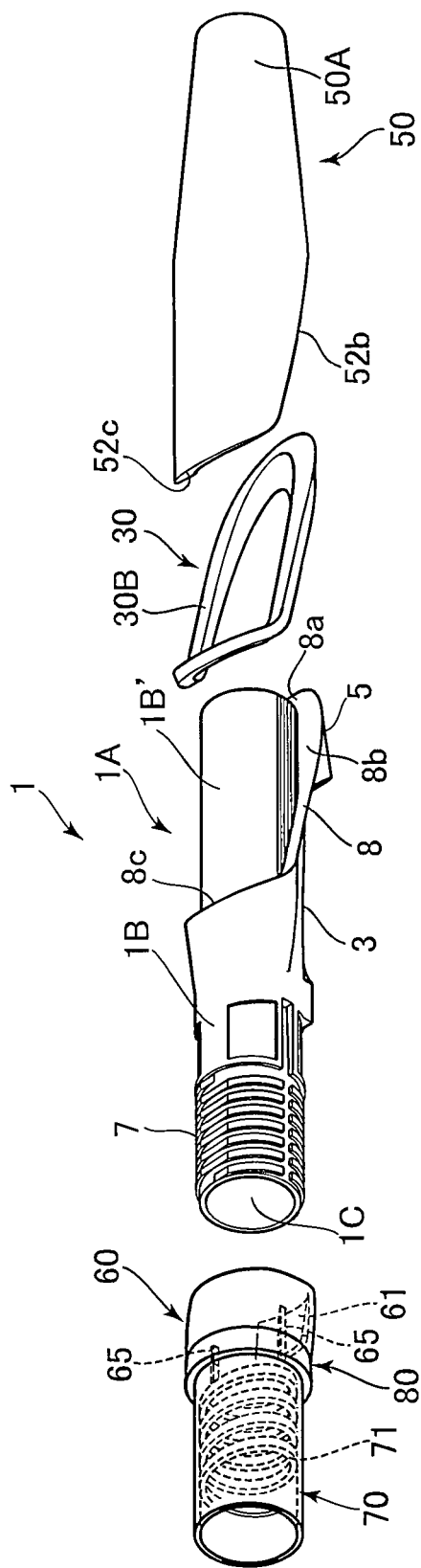
FIG. 2A is a view as viewed from above.
Figure 2B:
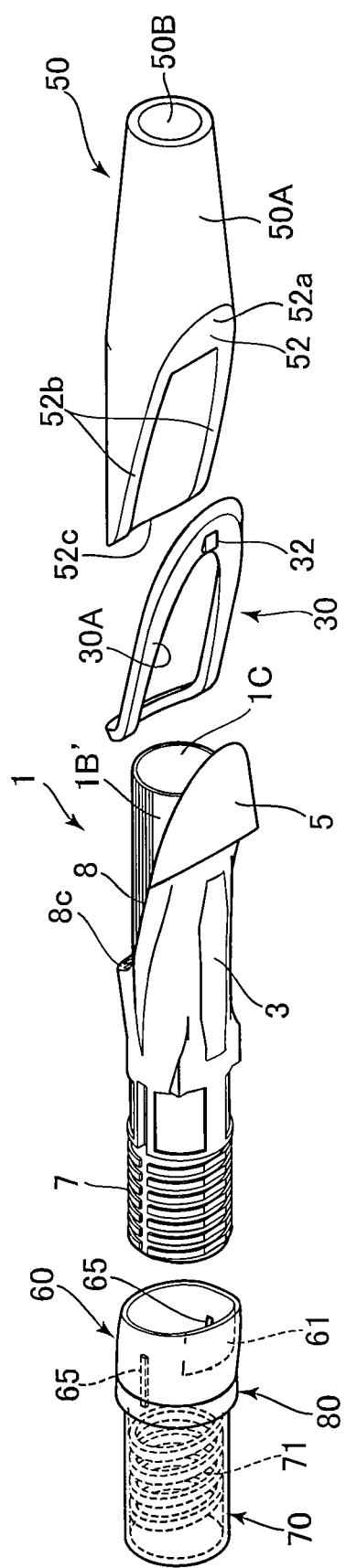
FIG. 2B is a view as viewed from below.

FIGS. 1 and 2 are views illustrating one embodiment of the reel seat according to the present invention. In the following description, a front-rear direction (axial direction) and an up-down direction mean directions illustrated in FIG. 1, and a left-right direction (side direction) means a direction orthogonal to a paper surface of FIG. 1. The reel seat of the present embodiment has a structure (odd-shaped grip structure) suitable for a fishing rod to which a spinning reel is attached, and the reel is mounted on a lower side. In addition, although the fishing rod fixed to the reel seat is not illustrated, a rear end portion (root rod) of a rod is fitted in the axial direction through an opening hole of the reel seat and fixed by adhesion or the like. A configuration of the fishing rod is not limited, and a telescopic type, an ordinarily jointed type, a single rod, or like may be adopted.

A seat main body 1A of a reel seat 1 according to the present embodiment is integrally formed of a transparent material such as nylon, polycarbonate, acryl, or urethane to achieve improvement in design, and is configured such that the inside of the seat main body 1A is visible. The seat main body 1A may be colorless and transparent, or may have a chromatic color, and a transmittance thereof is not limited as long as the inside of the seat main body 1A is visible. In addition, the seat main body 1A may be partially color-coded or have portions having different levels of transmittance. Alternatively, the seat main body 1A may be formed of a non-transparent material.

The seat main body 1A is formed in a tubular shape as a whole, a base end side of the rod (root rod) included in the fishing rod is inserted into an opening hole 1C formed in a tubular portion 1B and penetrating in the front-rear direction, and an outer peripheral surface of the rod is fixed by adhesion or the like. In this case, the base end side of the rod may be directly fixed to an inner peripheral surface of the opening hole 1C, or may be fixed with a tubular spacer interposed therebetween.

A tubular grip 50 to be gripped and held is integrated with the seat main body 1A. In addition, the grip 50 is attached to a rear side of the seat main body 1A, and a main body 50A of the grip 50 can be formed of a soft material such as natural cork, urethane, EVA, thermoplastic elastomer, or rubber that can improve feeling when the grip 50 is gripped, grip performance, and appearance, and can reduce weight, or can be formed by coating a hard member with one of these materials. The grip 50 is integrated with the seat main body 1A via a cover member described below, and when the grip 50 and the seat main body 1A are integrated with each other, an opening hole 50B penetrating through the main body 50A in the front-rear direction is coaxial with the opening hole 1C of the seat main body 1A, and the base end side of the rod is inserted and fixed to the opening hole 50B. In this case, the base end side of the inserted rod may be directly fixed to an inner peripheral surface of the opening hole 50B, or may be fixed with a tubular spacer interposed therebetween.

In the seat main body 1A, a reel leg placing portion 3 on which a reel leg of the spinning reel is placed, and a fixed hood 5 that is disposed on a rear side of the reel leg placing portion 3 and receives a rear end side of the reel leg are formed. In the seat main body 1A, a floating hood 60, a nut member 70 fitted to the floating hood so as to move the floating hood 60 in the axial direction in a state where the floating hood 60 is secured against rotation, and a click mechanism 80 provided in a fitting region between the floating hood 60 and the nut member 70 are disposed on a front side of the seat main body 1A in the axial direction that is opposite to the fixed hood 5. That is, the floating hood 60 that is opposed to the fixed hood 5 and can be moved forward and backward in the axial direction is disposed on the front side of the seat main body 1A (a front side of the reel leg placing portion 3).

The floating hood 60 is moved in the axial direction without rotating by rotationally operating the nut member 70 screwed to a male screw portion 7 formed at a front end of the tubular portion 1B, and tightens and fixes a front end side of a leg portion of the spinning reel placed on the reel leg placing portion 3. Therefore, the floating hood 60 comprises a hood portion 61 that is moved in the axial direction and receives a front end side of the reel leg.

A fitting structure of the floating hood 60 and the nut member 70, and a configuration of the click mechanism 80 will be described later.

An end surface (connection end surface) 52 of the grip 50 is disposed on an end surface (connection end surface) 8 on a grip side of the seat main body 1A so as to face the end surface 8, and the end surface 8 and the end surface 52 are integrated with a cover member 30 interposed therebetween. In this case, the reel seat 1 and the grip 50 of the present embodiment are configured as an odd-shaped grip in which a part of the grip in the axial direction is disposed so as to overlap the seat main body 1A of the reel seat, which improves appearance. Specifically, the seat main body 1A is formed so as to protrude rearward in a state where the tubular portion 1B is exposed, and the connection end surface 8 inclined upward is formed along an outer peripheral surface of an exposed protruding portion (hereinafter, referred to as an exposed protruding portion 1B').

The connection end surface 8 is configured as a step portion protruding outward along the outer peripheral surface of the exposed protruding portion 1B', and comprises a protruding step portion 8a protruding in a substantially semicircular shape in the axial direction at a lower end position of the exposed protruding portion 1B', both-side inclined step portions 8b formed so as to gradually rise toward the front side on both sides of the protruding step portion 8a, and an upper protruding step portion 8c formed so as to be continuous with the both-side inclined step portions 8b at an upper end position of the exposed protruding portion 1B'. The connection end surface 8 comprising the protruding step portion 8a, the both-side inclined step portions 8b, and the upper protruding step portion 8c described above is configured as an abutting surface exposed to the rear side, and the cover member 30 is in close surface contact with the abutting surface. The fixed hood 5 is integrated with lower sides of the both-side inclined step portions 8b from a lower surface of the protruding step portion 8a.

The connection end surface 52 on a connection side of the main body 50A of the grip 50 is cut so as to be inclined downward from an upper end in a connection region on a seat main body side, and a cut surface thereof comprises a lower end surface 52a, both-side inclined end surfaces 52b, and an upper end surface 52c so as to face the protruding step portion 8a, the both-side inclined step portions 8b, and the upper protruding step portion 8c of the seat main body 1A. These surfaces face one another with the cover member 30 interposed therebetween by fitting the exposed protruding portion 1B' of the seat main body 1A into the opening hole 50B on a front side of the grip 50.

When the exposed protruding portion 1B' of the seat main body 1A is fitted into the opening hole 50B on the front side of the grip 50, the cover member 30 is interposed therebetween. The cover member 30 has a ring-shaped frame structure extending in the axial direction and the up-down direction and having a front side bent and raised, and is formed of a non-transparent material. In a state where the above-described cover member 30 is interposed between the seat main body 1A and the floating hood 60, surfaces of the seat main body 1A, the cover member 30, and the grip 50 are substantially flush with one another, so that the seat main body 1A, the cover member 30, and the grip 50 have no uneven portion on the surfaces and are thus easy to grip. The cover member 30 can be integrally formed of, for example, resin, metal, wood, or the like, and the surface thereof may be provided with a color or a pattern, or may be plated with metal such as gold, silver, copper, or aluminum so as to have gloss. As described above, the thin linear cover member 30 is exposed at a boundary portion between the seat main body 1A and the cover member 30, so that the improvement in design can be achieved.

One surface (seat facing surface) 30A of the cover member 30 is bent so as to be in surface contact with the connection end surface 8 (the protruding step portion 8a, the both-side inclined step portions 8b, and the upper protruding step portion 8c) of the seat main body 1A, and the other surface (grip facing surface) 30B of the cover member 30 is bent so as to be in surface contact with the connection end surface 52 (the lower end surface 52a, the both-side inclined end surfaces 52b, and the upper end surface 52c) of the main body 50A of the grip.

Before the seat main body and the grip are mounted on the rod, the cover member 30 formed as described above is interposed between the connection end surface 8 of the seat main body 1A and the grip 50 (connection end surface 52) to integrate the seat main body 1A and the grip 50, and in the integrated state, the rod is inserted into the opening holes 1C and 50B and fixed with an adhesive or the like. In this case, even when the cover member 30 and the grip 50 are bonded with an adhesive, the non-transparent cover member 30 prevents the adhesive from being visually recognized through the transparent seat main body 1A. Therefore, it is not necessary to form a film that hides the adhesive on the seat main body 1A as in the related art. That is, there is no need to apply a masking coating material to the connection end surface 8 of the seat main body 1A or to perform a coating film forming process such as plating, and thus, it is possible to reduce a cost and labor of processing. In addition, since such a coating film is not formed, the transparent portion is not reduced and the appearance is not deteriorated, and there is no need to perform post-processing such as correcting or processing variations in the coating film.

Further, since the connection end surface 8 of the seat main body 1A and the connection end surface 52 of the grip 50 are formed so as to be inclined, a contact area with respect to the cover member 30 is increased, and a fixing force can be improved, and an area of the surface of the cover member that can be visually observed is also increased, and the design is improved.

In the above configuration, the cover member 30 is fixed to the seat main body 1A in advance, and the grip 50 is bonded to the cover member 30 in this state, so that assembling work can be easily performed.

In such a configuration, it is preferable that the connection end surface (seat facing surface) 30A of the cover member 30 and the connection end surface 8 of the seat main body 1A have recess-and-projection engagement portions with which both are immovably fitted. It is sufficient if such recess-and-projection engagement portions are formed in a region where both the members abut on each other. In the present embodiment, the recess-and-projection engagement portions are formed by forming a recessed portion 12 on the surface of a central portion of the protruding step portion 8a of the connection end surface 8 of the seat main body 1A, and forming a projection 32 fitted in the recessed portion 12 on the connection end surface (seat facing surface) 30A of the cover member 30 (the recess and the projection may be reversed).

With recess-and-projection engagement portions 12, 32, the cover member 30 can be fitted and fixed to the seat main body 1A so as not to be movable in the axial direction and a rotational direction, and in this state, the grip 50 is bonded to the cover member 30, by which the assembling work can be easily performed.

In addition, the above-described recess-and-projection engagement portions are preferably formed along the axial direction. Since the recess-and-projection engagement portions of both the members extend in the axial direction, the cover member 30 can be inserted into the seat main body 1A in the axial direction so as to be fitted to the outer peripheral surface of the exposed protruding portion 1B', and both the members can be integrated as they are. In the integrated state, the cover member 30 can be fixed in a state of not moving in the rotational direction, so that both the members can be stably fixed. In this case, it is preferable to form an inclined surface or a restricting surface that makes it easy for the recess-and-projection engagement portions to relatively move when assembled in the axial direction, and makes it hard for the recess-and-projection engagement portions to come off in the axial direction. This can make the assembly easy and prevent movement in the circumferential direction and in the axial direction after the assembly.

Next, the fitting structure of the floating hood 60 and the nut member 70, and the configuration of the click mechanism 80 will be described with reference to FIGS. 3 to 6.

Figure 3A:
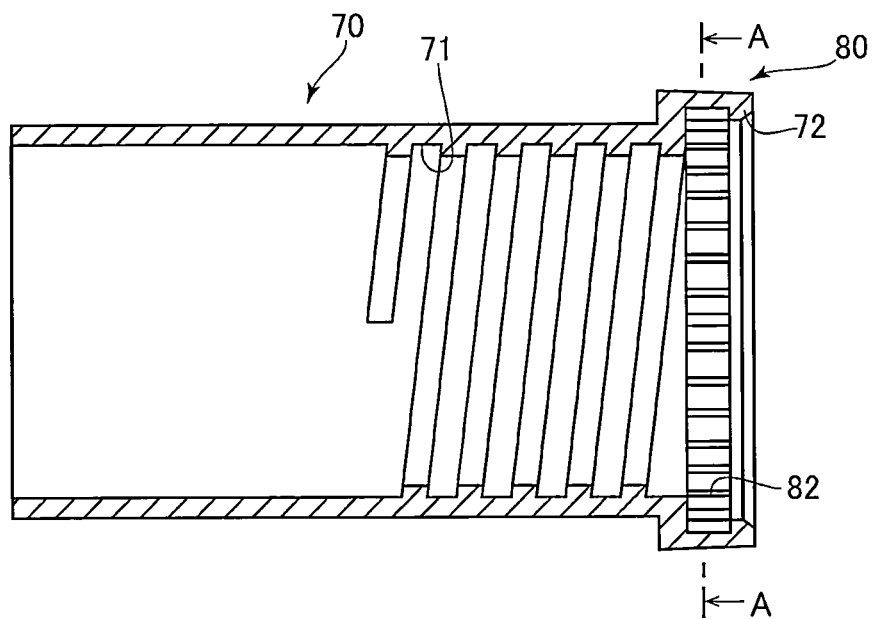
FIG. 3A is a cross-sectional view in the axial direction.
Figure 3B:
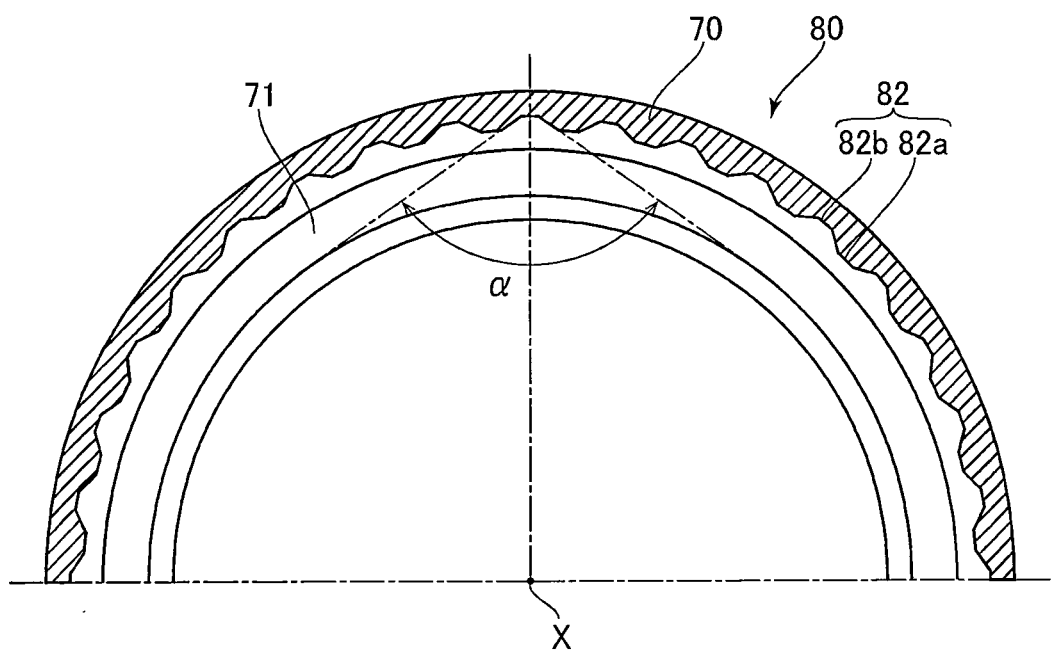
FIG. 3B is a cross-sectional view taken along line A-A of FIG. 3A.

The floating hood 60 and the nut member 70 are fitted to each other at a front end portion of the floating hood 60 and a rear end portion of the nut member 70, and the nut member 70 is externally fitted to a radially outer side of the floating hood 60. As illustrated in FIG. 3A, the rear end portion of the nut member 70 bulges radially, and the front end portion of the floating hood 60 illustrated in FIG. 4 is fitted to an inner surface side thereof.

A female screw portion 71 is formed on an inner peripheral surface of the nut member 70, and is screwed with the male screw portion 7 formed at a front end portion of the tubular portion 1B. Therefore, when the nut member 70 is rotationally operated, the nut member 70 is moved in the axial direction. In addition, an engagement structure for moving the floating hood 60 integrally with the nut member 70 when the nut member 70 is moved in the axial direction is provided in the fitting region between the floating hood 60 and the nut member 70. The engagement structure is configured by an engagement relationship between a flange 72 protruding radially inward at a rear end edge of the nut member 70 and a circumferential groove 62 formed on a rear side of a cylindrical protruding portion 63 at a distal end of the floating hood 60.

That is, by fitting the flange 72 of the nut member 70 into the circumferential groove 62 of the floating hood 60, the floating hood 60 is moved integrally with the nut member 70 in the axial direction when the nut member 70 is rotationally operated and moved forward and backward in the axial direction (front-rear direction). In this case, even when the nut member 70 is rotationally operated, the floating hood 60 is in a state of being secured against rotation by an anti-rotation structure so as not to rotate together. The anti-rotation structure can be configured, for example, by forming protrusions 65 on an inner peripheral surface of the floating hood 60 so as to extend in the axial direction, and forming long grooves 1E, into which the protrusions 65 enter, in the seat main body 1A so as to extend in the axial direction. According to such a configuration, even when the floating hood 60 tries to rotate together with the nut member 70, the rotation of the floating hood 60 is restricted by an engagement relationship between the protrusions 65 and the long grooves 1E, and the floating hood 60 can be moved in the axial direction. Such an anti-rotation structure comprising the protrusions and the long grooves may be formed at a plurality of places (two points at 180° intervals in the present embodiment), or the protrusions may be formed on the seat main body 1A and the long grooves may be formed in the floating hood 60.

The click mechanism 80 is provided in the fitting region between the floating hood 60 and the nut member 70, and in the present embodiment, is provided in a fitting region of a portion of the cylindrical protruding portion 63 at the distal end of the floating hood 60 on the front side of the engagement structure (flange 72) for moving the floating hood 60 integrally with the nut member 70 when the nut member 70 is moved in the axial direction. Specifically, the click mechanism 80 comprises recess-and-projections 82 that are formed on the inner peripheral surface of the nut member 70 over the circumferential direction and in which recesses 82b and projections 82a are formed adjacent to each other so as to produce click sound, a plate spring 90 comprising a top portion 90a that is engaged with the recess-and-projections 82, and an arc-shaped recessed portion 84 that is formed on an outer peripheral surface of the floating hood 60 and in which the plate spring 90 is installed.

Figure 4A:
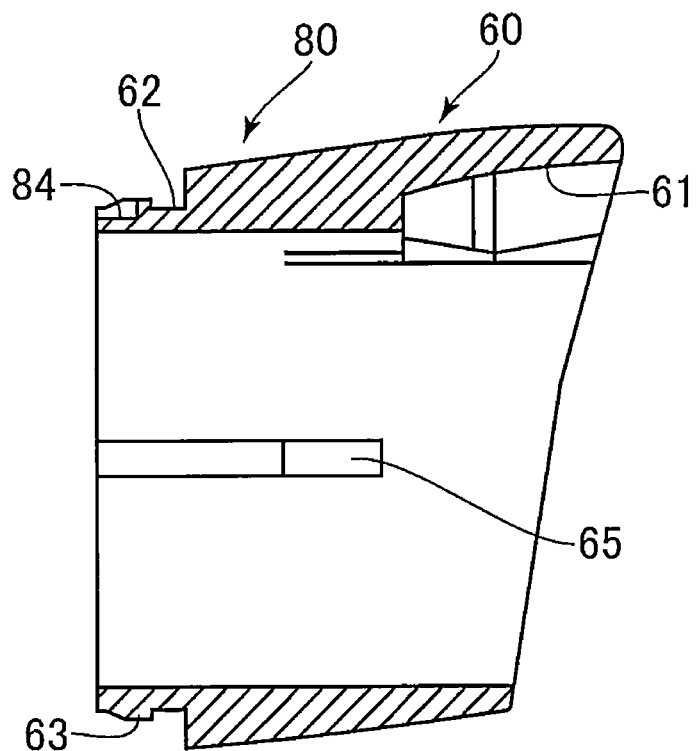
FIG. 4A is a cross-sectional view in the axial direction.
Figure 4B:
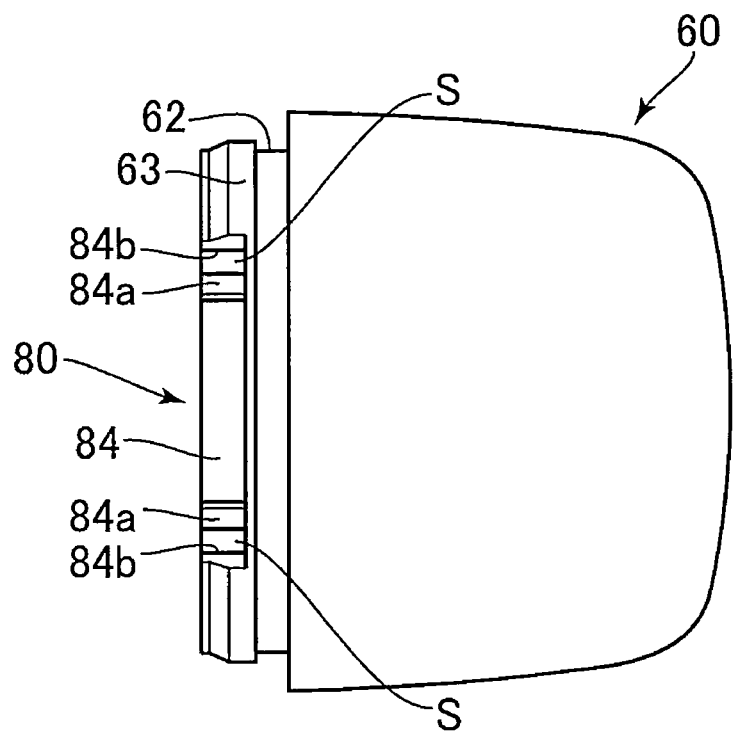
FIG. 4B is a plan view.

The recessed portion 84, being arc-shaped, is formed on the surface of the cylindrical protruding portion 63, is disposed adjacent to the hood portion 61 of the floating hood 60 in the axial direction as illustrated in FIGS. 4A and 4B, and is configured to emit sound in the vicinity of the hood portion 61.

Figure 5A:
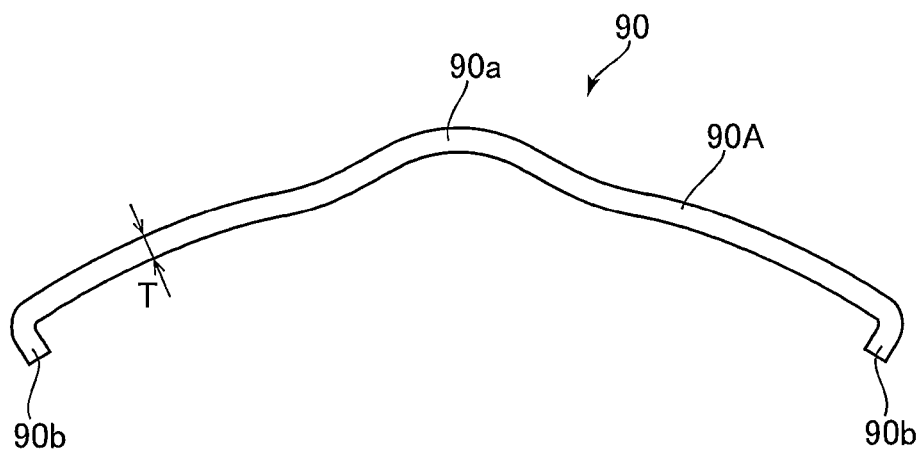
FIG. 5A is a front view and FIG. 5B is a side view.
Figure 5B:
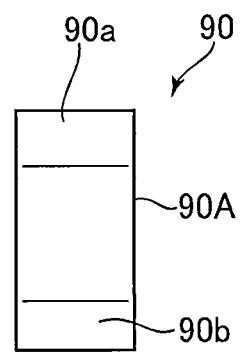

The plate spring 90 is disposed (placed) in the recessed portion 84. As illustrated in FIG. 5, the plate spring 90 is formed by bending a thin plate-shaped main body 90A along a surface shape of the recessed portion 84 so as to be disposed in the arc-shaped recessed portion 84. The top portion 90a protruding upward is formed at a middle portion of the plate spring 90, and bent locking portions 90b bent at substantially right angles in a direction opposite to the top portion are formed at both ends of the plate spring 90. The main body 90A is formed in a mountain shape as a whole and is preferably formed so as to be symmetrical in the right-left direction, so that the plate spring 90 can be installed (placed) inside the recessed portion 84 as it is. Thus, the plate spring 90 is not wound around the cylindrical protruding portion 63, but is positioned and placed in the recessed portion.

Figure 4C:
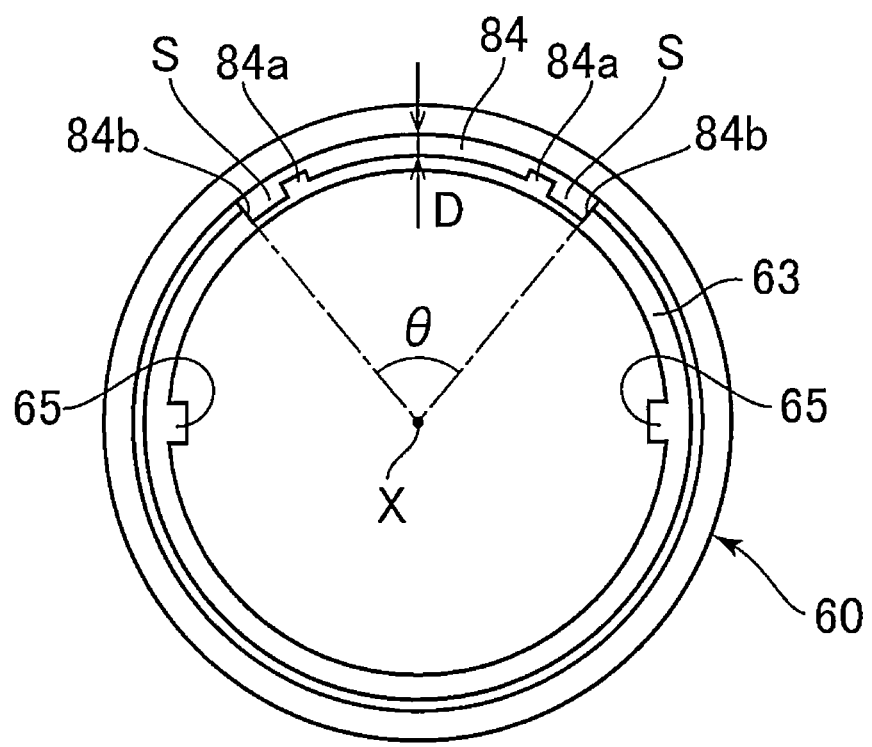
FIG. 4C is a view as viewed from a front side in the axial direction.

It is sufficient if a formation range of the recessed portion 84 (an angle θ of a formation range in the circumferential direction as viewed from the axial direction; see FIG. 4C) is less than 180° around an axial center X. Actually, the recessed portion 84 is only required to have a size that allows the click sound to be effectively produced by snapping back of the plate spring, and in consideration of simplification of the structure, weight reduction, workability of incorporation, and the like, it is sufficient if the formation range is a range of 50° to 120°, and preferably, a range of 60° to 90°. In addition, a material of the plate spring 90 may be a metal material such as aluminum or SUS or a resin material, and a shape thereof can be appropriately deformed.

Further, considering that a depth D of the recessed portion 84 is substantially equal to a thickness of the cylindrical protruding portion 63 of the floating hood in a reel seat according to the related art in which the click mechanism is not disposed, the depth D is preferably a value that does not result in a decrease in strength. Further, the depth D of the recessed portion 84 has a value that can prevent the recessed portion 84 from coming into contact with a back side of the top portion region when the top portion of the plate spring 90 snaps back by the recess-and-projections 82 of the nut member 70, thereby enhancing the click sound. Specifically, when the thickness is 0.5 mm to 1.5 mm, it is possible to enhance the click sound without causing a decrease in strength. In addition, a thickness T of the plate spring 90 installed in the recessed portion 84 having such a depth D is preferably 0.15 mm to 0.5 mm in consideration of the depth D of the recessed portion 84 and a snapback property.

As described above, the bent locking portions 90b are formed at both ends of the plate spring 90. Protrusions 84a are formed in the recessed portion 84 in which the plate spring is installed so that the bent locking portions 90b at both ends are locked. Each protrusion 84a is formed such that a gap S exists on an outer side in the circumferential direction, and the gap S is formed by inner walls 84b on both sides of the recessed portion 84 in the circumferential direction, the inner walls 84b defining the recessed portion 84. The gap S is formed to have a width larger than the thickness of the bent locking portion 90b in the circumferential direction, and the bent locking portion 90b is disposed in the gap S with some clearance.

Next, the production of the click sound by the click mechanism 80 will be described with reference to FIGS. 6 to 8. The click sound is produced by snapback engagement between the rotating recess-and-projections 82 and the top portion 90a of the plate spring 90 when the nut member 70 is rotationally operated. The number of recess-and-projections 82 formed (the number of projections 82a and recesses 82b formed in a set in the circumferential direction) is not limited, but the number of recess-and-projections is preferably 30 or more in consideration of ease of rotation when the nut member 70 is rotationally operated, a sound production state of the click sound, and the like.

Figure 6A:
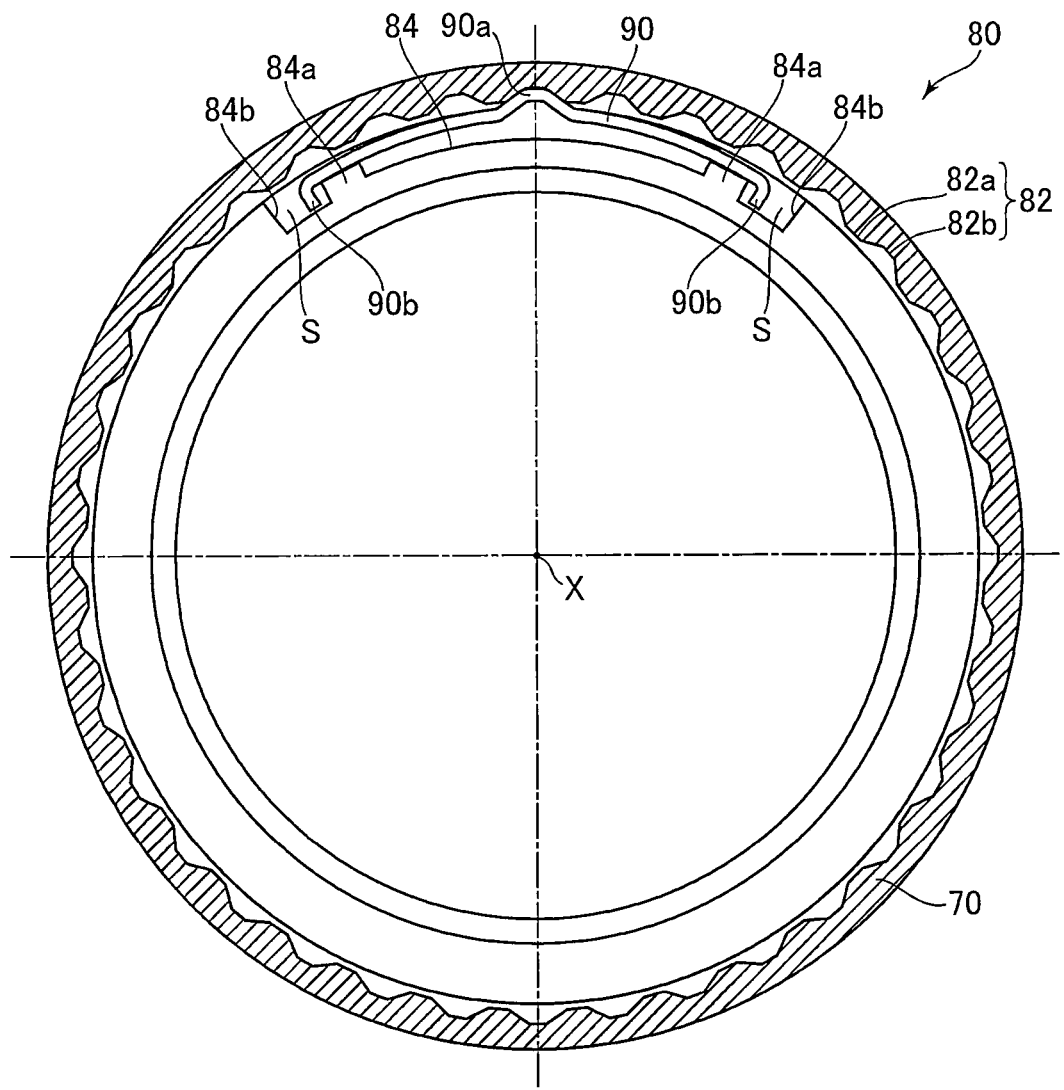
FIG. 6A is a view illustrating a state where a top portion of the plate spring is engaged with a recess of a recess-and-projection of the nut member.
Figure 6B:
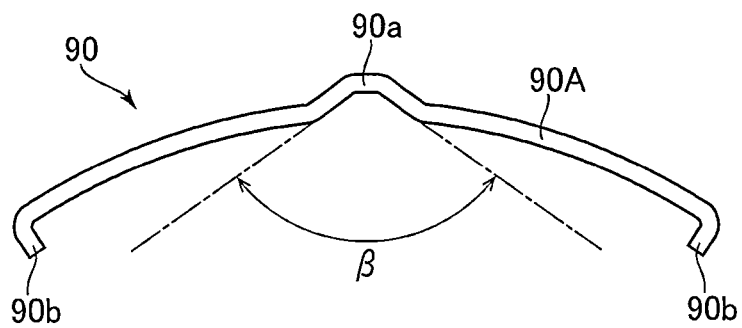
FIG. 6B is an enlarged front view of the plate spring portion.
Figure 7A:
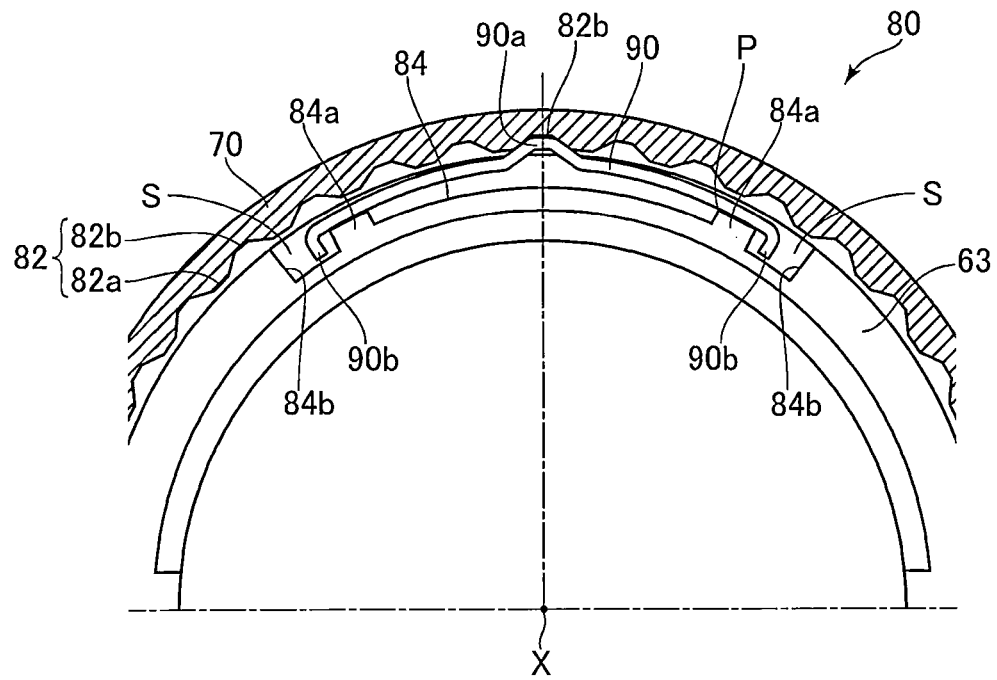
FIG. 7A is a view illustrating a state where the top portion of the plate spring is engaged with the recess of the recess-and-projection of the nut member.
Figure 7B:
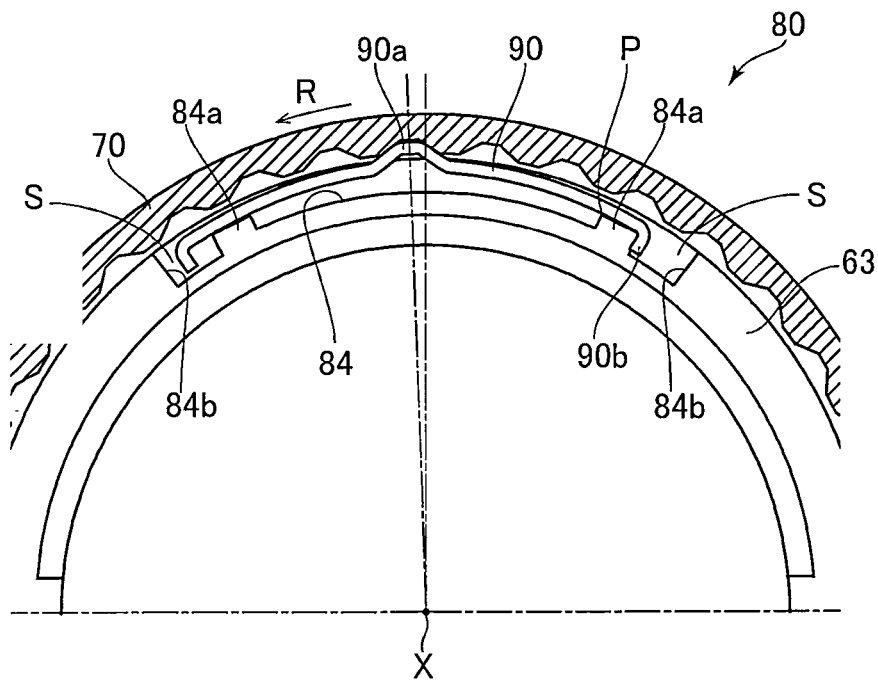
FIG. 7B is a view illustrating a state where the nut member is rotated in a counterclockwise direction.

As illustrated in FIGS. 6A and 7A, the bent locking portion 90b of the plate spring 90 is disposed in the gap S with some clearance. When the nut member 70 is rotationally operated in a counterclockwise direction (R direction) in this state, the bent locking portion 90b on the right side in the drawing abuts on the protrusion 84a on the right side in the drawing, and the plate spring 90 is restricted from rotating in the counterclockwise direction as illustrated in FIGS. 7A and 7B. At this time, an edge portion P of the protrusion 84a on the right side (an edge portion on a top portion 90a side) serves as a fulcrum position, and a force F acts in a direction orthogonal to an action line L connecting a point P and a point P1 at a position P1 abutting on the top portion 90a of the plate spring 90 in the recess 82b (see FIG. 8).

The top portion region of the plate spring 90 is pushed down in the recessed portion 84 by the force F acting on the top portion 90a of the plate spring 90, and when the top portion region of the plate spring 90 exceeds the rotating projection 82a, the top portion 90a snaps back and enters an adjacent recess 82b. The click sound is produced as sound resulting from the snapping back of the top portion 90a at this time continues.

In the above configuration, one end side of the plate spring 90 is supported by the edge portion (fulcrum) P of the protrusion 84a, and the other end of the plate spring 90 can be freely moved. Therefore, when the nut member 70 is rotationally operated, the plate spring 90 easily snaps back by the recess-and-projection 82, and the click sound is enhanced. Therefore, it is preferable that the gap S of the recessed portion is formed to have a size in which the bent locking portions 90b of the plate spring 90 do not abut on the inner walls 84b defining the recessed portion when the nut member 70 is rotationally operated. That is, by forming the gap S such that the bent locking portions 90b do not abut on the inner walls 84b as illustrated in FIG. 7B, the plate spring 90 is supported in a cantilevered state at the fulcrum P and easily snaps back, and large click sound can be generated. Further, the plate spring 90 can be easily installed by forming the gap S to have such a size.

In the click mechanism described above, it is preferable that a radial distance D1 (see FIG. 8) between an innermost diameter position P3 of the projection 82a of the recess-and-projection and an outermost diameter position P4 of the top portion 90a is in a range of 0.1 to 0.35 mm in a state where the top portion 90a of the plate spring 90 is engaged with the recess 82b of the recess-and-projection 82 of the nut member.

This is because when D1 is smaller than 0.1 mm, the nut member 70 is easily rotationally operated, but the click sound tends to be small, and conversely, when D1 is larger than 0.35 mm, the click sound becomes large, but the nut member 70 cannot be smoothly rotationally operated. Actually, the radial distance D1 is preferably in a range of 0.15 to 0.2 mm.

Figure 8:
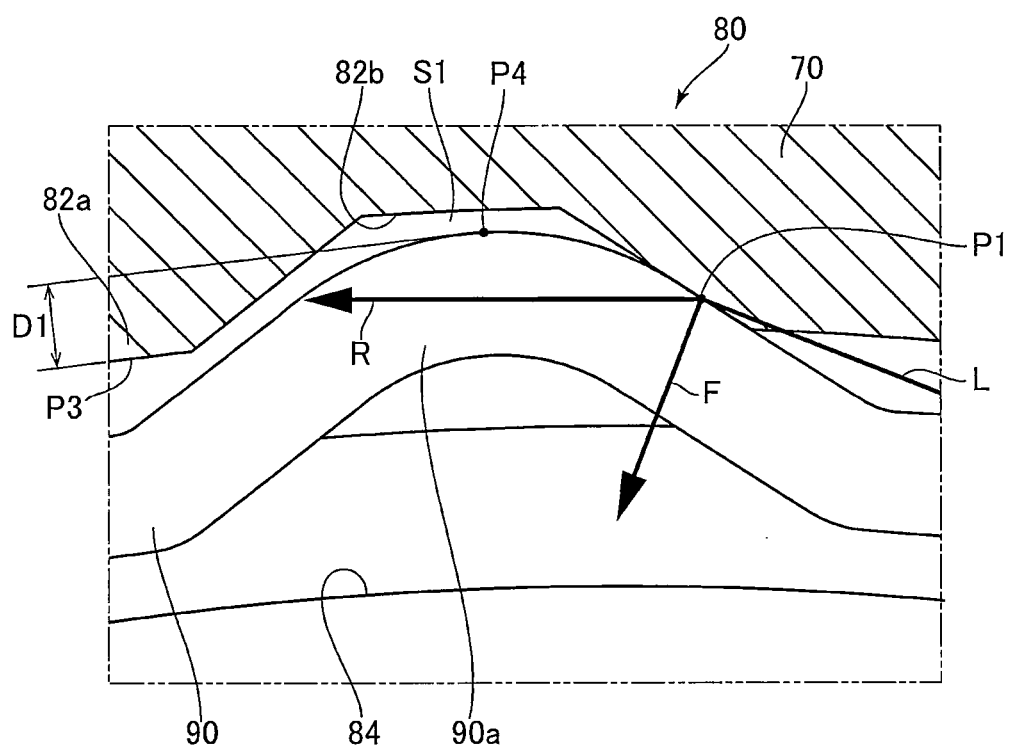
FIG. 8 is an enlarged view illustrating a state where the top portion of the plate spring engaged with the recess-and-projection of the nut member is deformed when the nut member is rotated in the counterclockwise direction.

As for the relationship between the top portion 90a of the plate spring 90 and the recess-and-projection 82, it is preferable to form the top portion 90a so as to have a curvature with which a gap S1 is formed between the top portion 90a and a bottom surface of the recess 82b as illustrated in FIG. 8 in a state where the top portion 90a is engaged with the recess 82b of the recess-and-projection 82.

According to such a configuration, the top portion region easily enters the recessed portion 84 when the plate spring 90 receives a force in an F direction by the rotation of the nut member 70, and the top portion region does not abut on the bottom surface of the recess when the plate spring 90 snaps back and returns, so that the click sound is easily produced, and the sound can be enhanced.

Figure 9A:
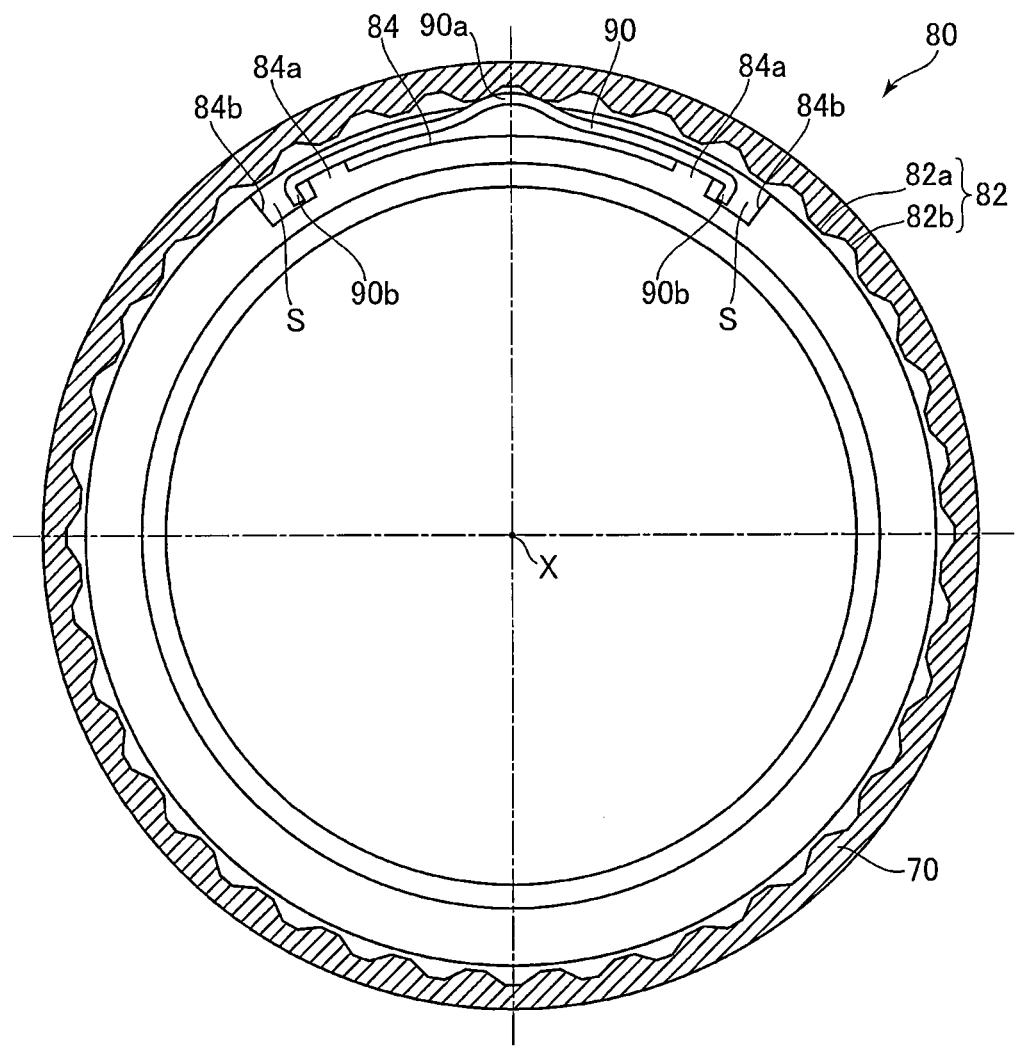
FIG. 9A is a view illustrating a state where the top portion of the plate spring is engaged with the recess of the recess-and-projection of the nut member.
Figure 9B:
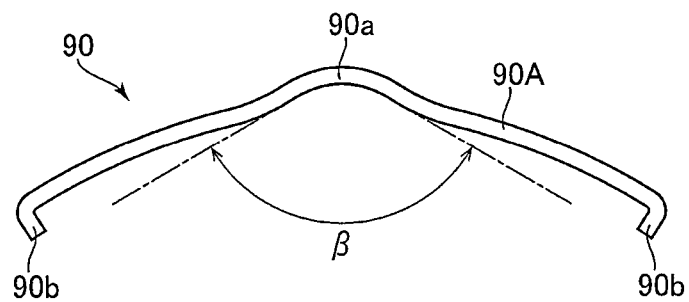
FIG. 9B is a front view of the plate spring.

In the engagement relationship between the recess-and-projection 82 and the plate spring 90, a magnitude relationship between an opening angle $\alpha$ (see FIG. 3B) formed by inner surfaces of the recess 82b and an opening angle $\beta$ (see FIG. 6B) formed by inner surfaces of the back surface of the top portion 90a of the plate spring 90 disposed therein is not particularly limited, but it is preferable that $\alpha \leq \beta$. In particular, as in a modification illustrated in FIG. 9, the top portion 90a of the plate spring 90 has a small curvature (a large radius of curvature) to form a curved shape having a low height, so that the top portion 90a is easily elastically deformed, and the gap S1 between the top portion 90a and the recess 82b is easily secured. Therefore, the nut member 70 can be easily rotationally operated, and the click sound can be enhanced.

As described above, the engagement relationship between the top portion 90a of the plate spring 90 and the recess-and-projection 82 (the projection 82a and the recess 82b) can be appropriately modified as long as the click sound is produced during the rotation operation of the nut member 70. As the top portion 90a of the plate spring 90 has a large radius of curvature with respect to an uneven surface as described above, the top portion 90a can be prevented from entirely entering the recess 82b, and as a side surface of an adjacent projection 82a presses the top portion 90a, a resistance at the time of rotationally operating the nut member 70 is reduced and rotational operability can be improved.

The click mechanism 80 of the reel seat as described above has a simple structure in which the arc-shaped recessed portion 84 is formed in the outer peripheral surface (the cylindrical protruding portion 63 at the distal end) of the floating hood 60 and the plate spring 90 is installed in the recessed portion 84, and thus it is not necessary to separately provide a support member for a spring member as in the related art. In addition, since the click sound is produced by the elasticity (snapping back in the up-down direction) of the plate spring 90 installed in the recessed portion 84, the structure is simplified, and outer diameters of the floating hood and the nut member are not increased. Furthermore, since the bent locking portion 90b is formed in the plate spring 90 and snaps back in a cantilevered state, the click sound can be enhanced.

While the embodiment of the present invention has been described above, the present invention is not limited to the above-described embodiment and can be variously modified.

While the above-described click mechanism 80 is formed adjacent to the hood portion 61 of the floating hood 60 in the axial direction, a position where the click mechanism is formed is not limited. In addition, since the click mechanism 80 has a simple structure in which the recessed portion 84 is simply formed in the fitting region of the floating hood 60, the outer diameters of the floating hood and the nut member are not increased even if the click mechanisms are formed at a plurality of places along the circumferential direction. The shape of the plate spring 90 is not particularly limited, and a plurality of top portions may be formed.

In addition, a material for forming the seat main body 1A is not limited, and a surface shape of the seat main body 1A can be variously modified to have, for example, recess-and-projections, thinned portions, openings or the like. In addition, a grip or the like may be attached to the surface of the nut member 70 described above. In addition, the floating hood 60 may be disposed on the rear side of the seat main body 1A or the floating hoods may be provided on both sides of the seat main body 1A. Furthermore, while the reel seat of the present embodiment has the structure in which the spinning reel is mounted, the real seat may be of a type in which a double bearing reel is mounted, and in such a seat main body, a trigger may be formed on a side opposite to the reel leg placing portion.

REFERENCE SIGNS LIST

1 Reel seat
1A Seat main body
1B Tubular portion
1C Opening hole
3 Reel leg placing portion
5 Fixed hood
60 Floating hood
70 Nut member
80 Click mechanism
82 Recess-and-projection
84 Recessed portion
84a Protrusion
90 Plate spring
90a Top portion
90b Bent locking portion
S Gap

The invention claimed is:

1. A reel seat comprising:
a seat main body comprising
a reel leg placing portion configured to have a reel leg of a fishing reel is placed on the reel leg placing portion, and
a tubular portion having an opening hole configured to have a rear end portion of a rod is fitted and fixed to the tubular portion, wherein
the seat main body comprises a floating hood that is configured to move in an axial direction and fix the reel leg placed on the reel leg placing portion,
a nut member that is fitted to the floating hood so as to move the floating hood in the axial direction in a state where the floating hood is secured against rotation, and
a click mechanism radially between the floating hood and the nut member,
the click mechanism comprises a recess-and-projection that is on an inner peripheral surface of the nut member and produces a click sound,
a plate spring having a top portion engaged with the recess-and-projection and having bent locking portions positioned at both ends of the plate spring,
a recessed portion that is arc-shaped and on an outer peripheral surface of the floating hood, and in which the plate spring is installed, and
protrusions on both sides of the recessed portion in a circumferential direction and engaged with the bent locking portions, and
the recessed portion is formed to have a gap between the bent locking portions and the recessed portion in a state where the bent locking portions of the plate spring are engaged with the protrusions by rotationally operating the nut member, and
the recessed portion is recessed in a cylindrical protrusion bounding a groove, and the groove is engaged with a flange of the nut member.

2. The reel seat according to claim 1, wherein the gap of the recessed portion is sized so that the bent locking portions of the plate spring do not abut on inner walls defining the recessed portion when the nut member is rotationally operated.

3. The reel seat according to claim 1, wherein the plate spring is formed such that a radial distance between an innermost diameter position of a projection of the recess-and-projection and an outermost diameter position of the top portion is 0.1 to 0.35 mm when the top portion of the plate spring is engaged with a recess of the recess-and-projection of the nut member.

4. The reel seat according to claim 1, wherein the top portion of the plate spring has a curvature with which a gap is formed between the top portion and a bottom surface of a recess of the recess-and-projection of the nut member in when the top portion is engaged with the recess.

5. A fishing rod to which the reel seat according to claim 1 is fixed.

* * * * *